United States Patent [19]

Buehler

[11] Patent Number: 5,424,263
[45] Date of Patent: Jun. 13, 1995

[54] SUPPORTED POLYMERIZATION CATALYST

[75] Inventor: Charles K. Buehler, Cincinnati, Ohio

[73] Assignee: Quantum Chemical Corporation, Cincinnati, Ohio

[21] Appl. No.: 52,317

[22] Filed: Apr. 23, 1993

[51] Int. Cl.⁶ .......................... G01J 31/00; C08F 4/02
[52] U.S. Cl. ..................... 502/116; 502/115; 502/119; 502/120; 502/125; 502/127
[58] Field of Search ............... 502/115, 116, 120, 125, 502/127, 119

[56] References Cited

U.S. PATENT DOCUMENTS

| | | |
|---|---|---|
| 3,135,809 | 6/1964 | Bosmaiian . |
| 3,591,656 | 7/1971 | Kroll . |
| 4,156,063 | 5/1979 | Giannini et al. . |
| 4,220,554 | 9/1980 | Seata et al. . |
| 4,226,741 | 10/1980 | Luciani et al. . |
| 4,252,930 | 2/1981 | Jenkins et al. ............... 526/139 |
| 4,298,718 | 11/1981 | Mayr et al. . |
| 4,390,454 | 6/1983 | Cuffiani et al. . |
| 4,495,338 | 1/1985 | Mayr et al. . |
| 4,508,843 | 4/1985 | Etherton et al. . |
| 4,526,941 | 7/1985 | Sakurai et al. . |
| 4,530,913 | 7/1985 | Pullukat et al. . |
| 4,565,795 | 1/1986 | Short et al. . |
| 4,595,735 | 6/1986 | Nomura et al. . |
| 4,612,299 | 9/1986 | Arzoumanidis et al. . |
| 4,647,550 | 3/1987 | Kohora et al. . |
| 4,686,199 | 8/1987 | Tachikawa et al. . |
| 4,738,942 | 4/1988 | Nowlin . |
| 4,743,665 | 5/1988 | Sasaki et al. . |
| 4,849,483 | 7/1989 | Tachikawa et al. . |
| 4,916,099 | 4/1990 | Sasaki et al. . |
| 4,950,630 | 8/1990 | Murata et al. . |
| 4,950,631 | 8/1990 | Buehler et al. . |
| 4,990,477 | 2/1991 | Kioka et al. ............... 502/107 |
| 5,034,365 | 7/1991 | Buehler et al. . |
| 5,098,969 | 3/1992 | Buehler et al. . |
| 5,143,883 | 9/1992 | Buehler . |

Primary Examiner—Asok Pal
Assistant Examiner—E. D. Irzinski
Attorney, Agent, or Firm—William A. Heidrich

[57] ABSTRACT

A catalyst component useful in the polymerization of olefins is disclosed. The catalyst component comprises the product obtained by steps of (a) contacting silica with at least one hydrocarbon soluble magnesium-containing compound; (b) contacting the product of step (a) with component (1), a heterocyclic fused ring compound substituted with at least one oxygen atom, and component (2), a modifying compound selected from the group consisting of silicon halides, boron halides, aluminum halides, alkyl silicon halides and mixtures thereof, with the proviso that components (1) and (2) be present such that the molar ratio of component (2) to component (1) is at least about 4:1; and (c) contacting the product of step (b) with a titanium-containing compound having the structural formula $TiX_m(OR)_n$, where X is halogen; R is hydrocarbyl; m is an integer of 1 to 4; and n is 0 or an integer of 1 to 3 with the proviso that the sum of m and n is 4. A catalyst system, used in the polymerization of alpha-olefins, which comprises the catalyst component of this disclosure, an aluminum-containing compound and a silane compound is also taught. Finally, a process for the polymerization of alpha-olefins, utilizing the catalyst system of the present disclosure, is described.

27 Claims, No Drawings

SUPPORTED POLYMERIZATION CATALYST

FIELD OF THE INVENTION

The use of Ziegler-Natta catalysts in the polymerization of olefins has reached the level of acceptance such that most olefinic polymerization reactions utilize these catalysts. The reason for this wide acceptance is the excellent yield of olefinic polymer having desired polymeric characteristics that are obtained using these catalysts. However, these catalysts have been the subject of innumerable advances in order to provide olefinic polymers with particular properties that are not within the ambit of polymers synthesized using the heretofore known Ziegler-Natta catalysts.

An important characteristic of olefin polymers that is the subject of continual interest is its stereospecificity. Those skilled in the art are aware that this characteristic is of critical importance in many classes of olefin polymers especially those, such a polypropylene, whose utility are dependent upon high strength properties.

The degree of crystallinity, i.e., stereospecificity, which dictates the physical properties of the polymer, is, in turn, a measure of the selectivity of the polymerization catalyst employed in its formation. Those skilled in the art are aware that a polymer produced in a polymerization reaction possesses a range of crystallinity. Thus, in order for a catalyst to produce a highly crystalline polymer it must obviously produce a highly selective product. That is, the range of crystallinity of a highly stereospecific polymer is very narrow. Therefore, a catalyst that produces a highly crystalline polymer eliminates or significantly simplifies separation operations.

Another advantage of catalysts producing highly crystalline polymers, other than reducing separation operations, is the absence of significant concentration of amorphous polymer, i.e., polymer of low crystallinity. Those skilled in the art are aware that amorphous polymer clings to processing equipment, plugs processing conduites and, in general, makes the polymerization reaction more difficult than in cases where amorphous polymer is absent or is present in very low concentration.

Of course, the major reason for producing high crystalline polymer is to provide a polymer having greater strength physical properties compared to other less crystalline polymers having approximately the same molecular weight. That is, the higher degree of crystallinity of a polymer the greater is its strength properties compared to other polymers of the same molecular weight having lower degrees of crystallinity.

A corollary to the advantages obtained by a catalyst that results in the formation of polymer of high stereospecificity is the additional advantage provided by such an olefinic polymer. An olefinic polymer possesses properties that permit its use as an extrusion or an injection molded product. The production of an olefinic polymer of high stereospecificity, that is, a polymer whose amorphous content is very low, is much more easily extruded or molded compared to olefinic polymers having lower degrees of crystallinity. The amorphous constituent when extruded or molded oftentimes degrades, which effect is manifested as "dye smoke." Thus, even if a catalyst produces an amorphous polymer which meets product specifications that catalyst is not as desirable as is a catalyst which while meeting product specifications produces a more highly crystalline polymer.

Commonly, in the polymerization of olefinic polymers, especially propylene polymers, a supported catalyst is utilized. Often, this support is a magnesium halide, separately supplied or formed in-situ. Since magnesium halide is corrosive, its residual presence in the olefinic polymeric product has the adverse effect of corroding polymeric processing equipment such as molding and extrusion apparatus. More significantly, the processed article, i.e., a molded or an extruded polymeric article, is aesthetically flawed due to this equipment corrosion.

Of course, this problem can be overcome by utilizing an unsupported catalyst. However, an unsupported polymerization catalyst requires an expensive and time consuming ball milling step. Therefore, there is a need in the art for a supported catalyst, i.e., a heterogenous catalyst, which is not subject to the corrosion problems discussed above.

The above remarks establish the need in the art for a new polymerization catalyst having a higher degree of stereospecificity and selectivity than is obtained by the catalyst of the prior art. These remarks also establish the desirability of producing such a catalyst on a support other than commonly employed magnesium halide.

BACKGROUND OF THE PRIOR ART

U.S. Pat. No. 4,693,990 to Hiroyuki et al. discloses an olefin polymerization catalyst that includes a phthalate electron donor component. This catalyst is produced by contacting a high dihydrocarbylmagnesium compound, a halogen-containing alcohol, diisobutyl-phthalate and titanium tetrachloride. It is emphasized that the electron donor utilized in the formation of this catalyst is distinguished from the class of electron donors generically defined as a heterocyclic fused ring compound substituted with at least one oxygen atom.

BRIEF SUMMARY OF THE INVENTION

A new catalyst component has been developed which provides a higher degree of stereospecificity and selectivity than those obtained in the prior art. This catalyst component is, moreover, supported, without the problems associated with magnesium halide supported olefin polymerization catalyst components of the prior art.

In accordance with the present invention a catalyst component is obtained. This catalyst component is produced by initially contacting silica with at least one hydrocarbon soluble magnesium-containing compound. The product of this step is, in turn, contacted with a heterocyclic fused ring compound substituted with at least one oxygen atom and a modifying compound selected from the group consisting of silicon halides, boron halides, aluminum halides alkyl silicon halides and mixtures thereof. Although the heterocyclic compound and the modifying compound may contact the silica-soluble magnesium-containing compound product in random order, it is necessary that the molar ratio of the magnesium-containing compound to the heterocyclic fused ring compound be at least about 4:1. The resultant product of this contact is then contacted with a titanium-containing compound having the structural formula $TiX_m(OR)_n$, where X is halogen; R is hydrocarbyl; m is an integer of 1 to 4; and n is 0 or an integer of 1 to 3, with the proviso that the sum of m and n is 4.

In further accordance with the present invention a catalyst system is provided. That system includes the catalyst component of the above paragraph, an aluminum-containing compound and at least one silane compound.

In still further accordance with the instant invention a process for polymerizing α-olefins is disclosed. That process includes polymerizing at least one α-olefin under α-olefin polymerization conditions in the presence of the catalyst system of the present invention.

DETAILED DESCRIPTION

The catalyst component of the present invention is produced in a series of steps that begins with silica contacting a hydrocarbon soluble magnesium-containing compound. The silica preferred for use in the catalyst of the present invention preferably has a surface area in the range of between about 80 and about 300 square meters per gram, a median particle size in the range of between about 20 microns and about 200 microns and a pore volume in the range of between about 0.6 and about 3.0 cc./gram.

The silica, preferably characterized by the above physical properties, is preferably pure but may include minor amounts of other inorganic oxides such as alumina, titania, zirconia, magnesia and the like. In general, the silica support comprises at least about 90% by weight pure silica. More preferably, the weight percentage of pure silica is at least about 95%. More preferably, the weight percent of pure silica is at least about 95%. Most preferably, the weight percent pure silica is at least about 99%. These percentages of pure silica are based on the total weight of the support.

It is particularly preferred that the silica utilized in the catalyst component of this invention be initially modified so that the surface of the silica, which contains hydroxyl groups, is replaced with a surface whose structural formula is defined by

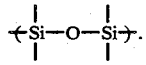

To accomplish this, in one preferred embodiment, the surface treatment is effected by calcining the silica in an inert atmosphere of at least about 150° C. More preferably, the calcining treatment involves calcining the silica at a temperature in the range of between about 550° C. and about 650° C. in an inert atmosphere which is preferably provided by an atmosphere of nitrogen gas.

In another preferred embodiment this pretreatment step, to remove surface hydroxyl groups, is accomplished by treating the silica with a hexaalkyl disilazane. Of the hexaalkyl disilazanes useful in this application, hexamethyl disilazane is preferred.

In still another preferred embodiment, the silica pretreatment step involves both calcining and treatment with hexaalkyl disilazane. That is, the silica is initially calcined in accordance with the above description followed by treatment with a hexaalkyl disilazane, in accordance with the above described procedure or first treated with hexaalkyl disilazane followed by calcining.

The silica, whether pretreated or not, is, as stated above, contacted with at least one hydrocarbon soluble magnesium-containing compound. Of the hydrocarbon soluble magnesium-containing compounds, dihydrocarbyloxymagnesium, hydrocarbyloxymagnesium halides and mixtures thereof are preferred. Of these two classes of compounds, magnesium dialkoxides, alkoxymagnesium halides and mixtures thereof are particularly preferred. Thus, such magnesium-containing compounds as 2-methylpentyloxymagnesium chloride, pentyloxymagnesium chloride, di-2-ethylhexyloxy-magnesium, 2-methylpentyloxymagnesium bromide, pentyloxymagnesium bromide and mixtures thereof are particularly preferred for use in this application.

The contact between the silica support and the soluble magnesium-containing compound of compounds usually occurs at a temperature in the range of between about 0° C. and about 100° C. More preferably, this contact occurs at a temperature in the range of between about 50° C. and about 100° C. Most preferably, the contact occurs at a temperature in the range of between about 60° C. and about 80° C. This contact occurs over a period of between about 5 minutes and about 2 hours. More preferably, the contact occurs over a period of between about 45 minutes and about 1.5 hours.

More specifically, contact between the silica and the hydrocarbon soluble magnesium-containing compound preferably involves heating the materials to a temperature in the range of between about 40° C. and about 80° C. for a period in the range of between about 20 minutes and about 1 hour under an inert atmosphere, preferably provided by nitrogen gas. This is followed by treatment of the product of contact between the silica and the magnesium-containing compound for an additional period of between about 20 minutes and 1 hour at a temperature of between about 60° C. and about 90° C. with stirring. Processing of the silica-magnesium product continues by further heating at a temperature in the range of between about 80° C. to about 95° C. for a period of between about 1 hour and 2 hours. As in the initial heating step, the two latter heating steps occur in an inert atmosphere, usually provided by nitrogen. The resulting solid product, characterized by a flour-like consistency is then cooled to room temperature.

The thus treated silica support is next contacted with two components. The first of these components is a heterocyclic fused ring compound substituted with at least one oxygen atom. This class of compounds is defined by the presence of an aryl ring fused to a heterocyclic ring and further limited by the requirement that at least one hydrogen atom, bonded to a carbon atom on the heterogeneous ring, is substituted with an oxygen atom. Although any aryl ring is within the contemplation of the heterocyclic fused ring compound, as long as it is fused to a heterocyclic ring, a phenyl or a naphthalenic ring is preferred. Of the two, a phenyl ring is more preferred.

Among the preferred heterocyclic fused ring compounds particularly preferred for use in the present catalyst are 3-benzylidenephthalide, also known by its commercial chemical name, benzylphthalide, having the structural formula

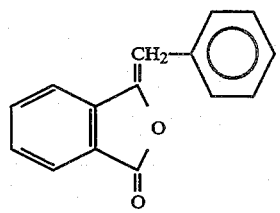

benzenetetracarboxylic dianhydride having the structural formula cresolphthalin having the structural formula

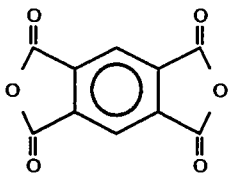

diphenic anhydride having the structural formula

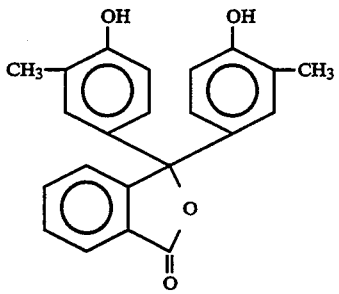

benz[CD]indol-2(1H) one having the structural formula

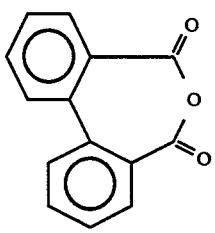

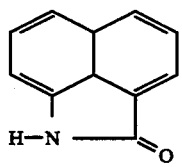

Other heterocyclic fused ring compounds which include at least one substitution of a hydrogen atom, attached to a carbon atom on the heterocyclic ring, with oxygen are within the scope of the present invention. The above recited grouping merely represents particularly preferred examples of the class of compounds employable in the production of the catalyst of this invention.

To illustrate, other heterocyclic fused ring compounds that may be used in the preparation of the catalyst of the instant invention include α,α-dephenyl-α-butylactone, dephenyl cyclopropenone, 4,5-diphenyl-1,3-dioxol-2-one, 2,3-diphenyl-1-indinone, 1,3-diphenyl isobenzofuran, diphenyl maleic anhydride, 2-ethylanthraquinone, 1-fluoroenecarboxylic acid, 9-fluorenone, 9-fluorenone-4-carbonyl chloride and (+)-1-(9-fluorenylethyl chloroformate.

The above examples are supplied to emphasize the scope of compounds within the contemplation of this generic class of compounds. This list should thus not be assumed to limit or exclude other species within the contemplation of the generic class of heterocyclic fused ring compounds of the present invention.

A second compound is contacted with the product of silica and the soluble magnesium-containing compound. This second compound is a modifying compound selected from the group consisting of silicon halides, boron halides, aluminum halides, alkyl silicon halides and mixtures thereof. Of these, silicon halides, boron halides and aluminum halides are preferred. More preferably, the modifying compound is silicon tetrahalide, boron trihalide or aluminum trihalide. Within the contemplation of these three classes of compounds, silicon tetrachloride, silicon tetrabromide, boron trichloride and aluminum trichloride are more preferred. Silicon tetrachloride and silicon tetrabromide are still more preferred. The most preferred modifying compound is silicon tetrachloride.

The order of contact between the product of the contact between silica and the soluble magnesium-containing compound and the heterocyclic fused ring and modifying compounds is random. That is, either of the two components can contact the silica-magnesium-containing compound product first. Although the invention is independent of which of these two compounds first contacts the silica-magnesium-containing compound product, it is preferred that the heterocyclic fused ring compound substituted with at least one oxygen atom contact the silica-magnesium-containing compound product prior to contact with the modifying compound.

Independent of which of the two compounds initially contacts the silica-magnesium-containing compound product, both of these compounds contact the silica-magnesium product at a temperature in the range of between about 0° C. and about 100° C. over a time period of between about 30 minutes and about 2 hours. More preferably, this contact occurs at a temperature in the range of between about 50° C. and about 80° C. in a time period of between about 45 minutes and about 1.5 hours.

The product, after contact with the heterocyclic fused ring compound and the modifying compound, is, in a preferred embodiment, washed. Washing of this product constitutes immersing the product in an organic solvent, preferably a hydrocarbon solvent. Of the hydrocarbon solvents, alkanes having 5 to 20 carbon atoms are preferred. Of these, hexane and heptane are particularly preferred. Although the washing procedure may represent any number of fresh washings, 2 to 4 washings with fresh organic solvent is preferred. Each washing repetition involves immersion of the silica composition with a fresh charge of between about 50 ml. and 150 ml. of the organic solvent. Preferably, the volume of solvent is between about 60 ml. and about 100 ml.

The product of contact with the heterocyclic fused ring compound and the modifying compound, preferably washed, is next contacted with a first titanium-containing compound. The first titanium-containing compound has the structural formula $TiX_m(OR)_n$, where X is halogen; R is hydrocarbyl; m is an integer of 1 to 4; and n is 0 or an integer of 1 to 3 with the proviso that the sum of m and n is 4.

In a preferred embodiment, the first titanium-containing compound, having the structural formula recited above, is defined by m being an integer of 2 to 4; and n being 0, 1 or 2. Among the titanium-containing compounds within the contemplation of this preferred embodiment are titanium tetrachloride, titanium tetrabromide, methoxytitanium trichloride, methoxytitanium tribromide, ethoxytitanium trichloride, dimethoxyltitanium dichloride, diethoxytitanium dibromide and the like.

Still more preferably, the first titanium-containing compound has the structural formula recited above where m is 4 and n is 0. In this more preferred embodiment the titanium-containing compound is preferably titanium tetrachloride or titanium tetrabromide. Of these, titanium tetrachloride is particularly preferred.

The contact between the silica-containing composition, treated in accordance with the above recited steps, and the first titanium-containing compound occurs at a temperature in the range of between about 0° C. and about 150° C. Preferably, the temperature of this contact is in the range of between about 85° C. and about 105° C. The duration of contact, at these temperature ranges, is a period of between about 30 minutes and about 4 hours. More preferably, this contact occurs over a period of between about 45 minutes and about 3 hours. Most preferably, the time of contact is in the range of between about 1 hour and 2.5 hours.

In a preferred embodiment, an additional step is included. In this step, which occurs prior to the contact step with the first titanium-containing compound, a second titanium-containing compound, not identical to the first titanium-containing compound, having the structural formula $Ti(OR^1)_pX^1_q$, where $R^1$ is hydrocarbyl; $X^1$ is halogen; p is an integer of 1 to 4; and q is 0 or an integer of 1 to 3, with the proviso that the sum of p and q is 4, contacts the usually washed product of silica contacted with the soluble magnesium-containing compound, the heterocyclic fused ring compound and the modifying compound.

In a preferred embodiment of this preferred included step in the formation of the catalyst component the second titanium-containing compound has the structural formula recited above wherein $R^1$ is aryl or alkyl; p is 2 to 4; and 1 is 0, 1 or 2. Thus, the second titanium-containing compound is a tetrahydrocarbyloxytitanium compound, a trihydrocarbyloxytitaniumhalide or a dihydrocarbyloxytitanium dihalide.

In an even more preferred embodiment of the present invention, the second titanium-containing compound is a titanium ester free of halogen atoms. That is, the second titanium-containing compound is characterized by p being 4 and q being 0. Particularly preferred titanium esters for use as the second titanium-containing compound include titanium tetracresylate, titanium tetraisobutylate, titanium tetra-n-propylate, titanium tetraisopropylate and the like.

Contact between the silica composition and the second titanium-containing compound occurs under ambient conditions. Thus, the conditions of contact, in terms of temperature and duration, are those recited above for the contact between the silica composition and the first titanium-containing compound. It should be appreciated that, in the preferred embodiment, wherein a second titanium-containing compound is utilized, the step of contact with the second titanium-containing compound is immediately followed by contact with the first titanium-containing compound.

Upon completion of contact with the first titanium-containing compound, independent of whether or not a second titanium-containing compound is utilized, the final product may be washed. This optional washing step, after contact with the first titanium-containing compound, if conducted, as in the preferred earlier washing step, involves contact with an organic solvent. The preferred organic solvent used in this second washing step is identical with the class of compounds recited for use as the organic solvent in the first washing step discussed above. However, whereas 2 to 4 washing repetitions are preferred in the first washing step, this second washing step preferably involves between about 5 to 10 washing repetitions, preferably about 6 to about 8 washings, with an organic solvent. Again, as in the first washing step, each washing repetition involves immersion of the product in between about 50 ml. and about 150 ml., preferably, between about 70 ml. and about 100 ml. of organic solvent.

It should be appreciated that all the treatment steps in the formation of the catalyst component of this invention involves contact between a solid and a liquid. The solid, of course, is silica. All the other recited compounds included in the formation of the present catalyst are liquids. That is, the compounds are liquid at ambient conditions or are soluble in an inert hydrocarbon solvent. As such, no ballmilling or other solid mixing is required. The expense and difficulty of solid mixing, common in the formation of polymerization catalysts of the prior art, is thus eliminated.

A further observation is that the above recited steps in the formation of the catalyst component establishes that there is no halogen in the support. The support is silica. This absence of halogen is a key factor in the low halogen content of polymer produced in catalytic polymerization reactions using the catalyst of this invention. In addition, the concentrations of titanium and magnesium employed in the formation of the catalyst are kept low. This insures that the concentration of these metals in the catalyst and hence in the formed polymers are maintained at low levels.

Another aspect of the present invention is directed to a catalyst system. The catalyst system of the present invention includes the above discussed catalyst component, a first cocatalyst, an aluminum-containing compound, and a second cocatalyst, at least one silane compound.

The first cocatalyst of the catalyst system is an aluminum-containing compound. Preferably, the aluminum-containing compound is an alkyl aluminum compound, an alkyl aluminum halide or a mixture thereof. More preferably, the first cocatalyst aluminum-containing compound is an alkyl aluminum compound. Of the alkyl aluminum compounds within the contemplation of the catalyst system of this invention, triethylaluminum and tri-n-propylaluminum are particularly preferred.

The second cocatalyst of the catalyst system of this invention, at least one silane compound, is preferably a hydrocarbylalkoxysilane. Preferred hydrocarbylalkoxysilanes for use in the catalyst system include hydrocarbyltrialkoxysilanes, dihydrocarbyldialkoxysilanes and trihydrocarbylalkoxysilanes. Independent of which of these hydrocarbylalkoxysilanes are employed, it is preferred that the hydrocarbyl or hydrocarbyls bonded to the silicon atom of the silane compound be $C_1$-$C_6$ straight, branched or cyclic alkyl. Particularly preferred silane compounds, useful as the second cocatalyst, include hexyltrimethoxysilane, amyltriethoxysilane, isobutyltrimethoxysilane, isobutylisopropyldimethoxysilane, diisopropyldimethoxysilane and the like.

In yet another aspect of the present invention a process of polymerizing olefins, preferably alpha-olefins, especially the homo- or copolymerization of propylene, is disclosed. This polymerization process is conducted under usual thermodynamic conditions employed for the polymerization of an olefin, preferably alpha-olefins and especially propylene, in the presence of the aforementioned catalyst system. For example, in the preferred embodiment wherein the process involves the polymerization of propylene, the polymerization process occurs at a temperature in the range of between about 35° C. and about 100° C. and a pressure in the range of between about 300 psig and about 600 psig. More preferably, the thermodynamic conditions under which this process occurs is a temperature in the range of between about 50° C. and about 80° C. and a pressure in the range of between about 400 psig and about 500 psig.

The following examples are given to illustrate the scope of this invention. Because these examples are given solely for illustrative purposes, the present invention should not be limited thereto.

EXAMPLE 1

Catalyst Component Preparation

A catalyst component was prepared by introducing silica (5.0 g.) which had previously been treated with hexamethyl disilazane into a 4-necked, 250 ml. round bottomed flask equipped with a nitrogen purge, a paddle stirrer and a condenser. Nitrogen gas, free of oxygen and water, was introduced into the flask to purge it and provide a nitrogen atmosphere. While nitrogen gas continued to flow into the flask, the flask was heated at 100° C. for one hour. The flask was thereupon allowed to cool to ambient temperature.

A hydrocarbon soluble liquid compound, 2-methyl-1-pentyloxymagnesium chloride (5.4 g., 37 mmol.), was introduced into the flask under the aforesaid nitrogen purge after which the product of this step was contacted with 3-benzylidenephthalide (0.41 g., 1.85 mmol.). The flask was thereupon heated to 60° C. for 30 minutes with stirring. After 30 minutes, the temperature of the flask was raised to 80° C. for an additional 30 minutes while maintaining stirring and the nitrogen purge. Finally, the temperature was raised to between 100° C. and 110° C. for about 1.5 hours. At this point heating, but not stirring, ceased and the flask was allowed to cool to ambient temperature. The final product of this contact was a solid which included approximately one half the solvent originally present.

To this product was added heptane (10 ml.) followed by contact with silicon tetrachloride (6.27 g., 37 mmol.). Upon addition of the silicon tetrachloride, the components of this contact were subjected to stirring at ambient temperature for 30 minutes. Thereupon, the temperature was raised to 60° C. for 30 minutes. At this time, stirring was stopped, the solid was allowed to settle and the supernatant siphoned off.

The product of this contact was washed with heptane by immersing the solid in fresh heptane (70 ml ). The resultant slurry was stirred at ambient temperature followed by removal of the supernatant by siphon. This procedure was repeated two additional times.

The washed product was contacted with a solution of titanium tetracresylate (1.76 g., 3.26 mmol.) in a 50% by volume solution in heptane. Immediately thereafter, titanium tetrachloride (17.1 g., 90 mmol.) was added thereto at ambient temperature. Upon addition of the two titanium-containing compounds, the flask was heated at a temperature in the range of 90° C. to 100° C. and maintained in this temperature range for one hour.

The product of this contact was washed with heptane in accordance with the earlier washing step. This second washing procedure, different from the first procedure only by the volume of heptane, utilized 90 ml. rather than the 70 ml., used in the first washing step, and by the total number of washing cycles, 8 instead of 3.

The final washed product was uniformly sized, salmon-colored particles.

EXAMPLE 2

Catalyst Component Preparation

A catalyst component was produced in accordance with the procedure of Example 1 but for a doubling in the concentration of the 3-benzylidenephthalide and a reduction in the concentration of the titanium tetracresylate. In this example 3-benzylidenephthalide was provided in an amount of 0.83 g. (3.75 mmol.). The 50% titanium tetracresylate solution supplied 1.09 g. (2.275 mmol.) titanium tetracresylate.

As in Example 1 the product of this synthesis was salmon-colored, uniform solid particles.

EXAMPLE 3

Catalyst Component Preparation

The catalyst component preparation of Example 1 was repeated but for a doubling in the concentration of 3-benzylidenephthalide and a reduction by 60% in the concentration of the titanium tetracresylate component. Thus, 3-benzylidenephthalide was provided in an amount of 0.83 g. (3.75 mmol.). The titanium tetracresylate, included in a 50% by volume solution in heptane, introduced 0.54 g. (1.3 mmol.) of titanium tetracresylate.

The product of this synthesis was a salmon colored solid.

EXAMPLE 4

Catalyst Component Preparation

The catalyst component preparation of Example 1 was repeated but for an increase in the amount of 3benzylidenephthalide and the decrease in the amount of titanium tetracresylate utilized in the formation of the catalyst. In this example the weight of 3-benzylidenephthalide added to the composition was 0.625 g. (2.8 mmol.). The decreased amount of titanium tetracresylate (0.54 g., 1.3 mmol.) was again added as a 50% by volume solution in heptane.

The catalyst component product of this preparation was a deep salmon-colored solid.

EXAMPLE 5

Catalyst Component Preparation

The catalyst component preparation of Example 1 was repeated but for the quadrupling of the concentration of the 3-benzylidenephthalide utilized in its formation. Moreover, the synthesis procedure omitted the step wherein titanium tetracresylate was introduced therein. Rather, this step was replaced with a second contact with titanium tetrachloride as described in Example 1. It is emphasized that two titanium tetrachloride contact steps of this example involved, in each case, the introduction of 17 g. (90 mmol.) of said titanium tetrachloride. It is furthermore emphasized that, unlike Example 1, the product after the first addition of titanium tetrachloride was washed eight times in heptane (80 ml.) In addition, eight identical washes in heptane (80 ml.) of the product also were conducted after the second addition of titanium tetrachloride.

The resultant product of this preparation was a violet-black solid of uniform particle size.

EXAMPLE 6

Catalyst Component Preparation

The process of forming a catalyst component of Example 1 was repeated but for changes in concentrations of the various constituents contacted therein. The 2-methyl-1-pentyloxymagnesium chloride was provided in an amount of 2.13 g. (12.5 mmol.) rather than the 5.4 g. (37 mmol.) of Example 1. The 3-benzylidene phthalide was provided in an amount of 0.18 g. (0.81 mmol.) rather than the 0.41 g. (1.85 mmol.) of Example 1. In addition, the 3-benzylidene-phthalide was mixed with 2-methylpentyloxymagnesium chloride prior to contact with the silica. The silicon tetrachloride was provided in an amount of 2.13 g. (12.5 mmol.) rather than the 6.27 g. (37 mmol.) of Example 1. The titanium tetracresylate was included in an amount of 1.25 g. (2.3 mmol.) rather than the 1.76 g. (3.26 mmol.) of Example 1. The silica and titanium tetrachloride concentrations were identical with those of Example 1.

The result of this catalyst component formation was a dark salmon-colored solid of uniform particle size.

EXAMPLE 7

Catalyst Component Preparation

The catalyst component preparation of Example 6 was reproduced but for the sequence of addition of the components used in the formation of that solid catalyst component. In this example the 2-methyl-1-pentyloxymagnesium chloride was contacted with silica prior to the addition thereto of the silicon tetrachloride. The product was thereupon washed. Thereafter, 3-benzylidene phthalide was added followed by contact with titanium tetrachloride. It is emphasized that all of the above discussed components were introduced in identical amounts to those amounts utilized in Example 6.

The reaction between the product prior to contact with 3-benzylidene phthalide and titanium tetrachloride and these two compounds occurred over a period of 1 hour at a temperature in the range of between 90° C. and 100° C. At the conclusion of this reaction, the product was washed in accordance with the procedure set forth in Example 1.

The final product, after the washing step, was a deep salmon-colored solid of uniform particle size.

COMPARATIVE EXAMPLE 1

Catalyst Component Preparation

The catalyst component of this example was prepared identically with the procedure of Example 6 but for the sequence of addition of two of the components. Whereas in Example 6, the 2-methyl-1-pentyloxymagnesium chloride initially contacted the silica followed by the introduction of the 3-benzylidene phthalide, in this comparative example this contacting sequence was reversed. That is, in this comparative example the 3-benzylidenephthalide contacted the silica followed by contact with the 2-methyl-1-pentyloxymagnesium chloride.

The resultant product of this synthesis was a white solid having flour-like consistency.

EXAMPLE 8

Catalyst Component Preparation

The catalyst component preparation of Example 6 was identically followed but for the replacement of 3-benzyl-idenephthalide with 1,2,4,5-benzenetetracarboxylic dianhydride (0.94 g., 3.7 mmol.).

The product of this catalyst component preparation was a white solid.

EXAMPLE 9

Catalyst Component Preparation

The catalyst component preparation of Example 6 was reproduced but for the replacement of the 3-benzylidenephthalide with dicresol phthalein (0.64 g., 1.85 mmol.).

The product of this catalyst component preparation was a white solid.

EXAMPLE 10

Catalyst Component Preparation

The catalyst component preparation of Example 6 was reproduced except that the 3-benzylidenephthalide component was replaced with diphenic anhydride (0.83 g., 3.7 mmol.). Moreover, the diphenic anhydride was introduced into the product by being mixed with the 2-methylpentyloxymagnesium chloride component and the mixture of 2-methylpentyloxymagnesium chloride and diphenic anhydride contacted the silica rather than the procedure used in Example 6. If the procedure of Example 6 was followed, the diphenic anhydride would have had to be introduced by contacting the product of contact between the silica and the 2-methylpentyloxymagnesium chloride.

The catalyst component product of this example was a white solid.

EXAMPLE 11

Catalyst Component Preparation

The catalyst component preparation procedure of Example 6 was reproduced except that the 3-benzylidenephthalide was replaced with benz[CD]indol-2(1H)one (0.104 g., 0.625 mmol.) and, as in Example 10, the benz[CD]indol-2(1H) one was mixed with 2-methyl-1-pentyloxymagnesium chloride prior to contact with silica rather than the sequential addition of 3-benzylidenephthalide to the product of contact between the 2-methyl-1-pentyloxymagnesium chloride and silica.

The product of this catalyst component preparation was a white solid.

EXAMPLES 12 TO 22 AND COMPARATIVE EXAMPLES 2 AND 3

Polymerization of Propylene

Propylene (325 g.) was polymerized in a series of reactions which occurred in a stirred (400 rpm) Parr [trademark] reactor maintained at a temperature of 70° C. and a pressure of 460 psig over a period of 1 hour. During each of the reaction runs 200 ml. of hydrogen was introduced therein.

Each of the polymerization reactions, constituting Examples 12 to 22 and Comparative Examples 2 and 3, involved the use of 0.02 g of the catalyst components produced in accordance with Examples 1 to 11 and Comparative Example 1, respectively. In addition to the catalyst component, two cocatalysts, triethylaluminum (TEAL) and isobutylisopropyldimethoxysilane (IBIP) was included. The amounts of these two cocatalysts employed were such that the molar ratio, in each example, of TEAL to IBIP was 80:8.

A summary of these polymerization examples, is provided in the Table.

TABLE

| Polymer of Ex. No. | Catalyst of Ex. No. | Molar Ratio[1] | Wt % Ti[2] | Activity[3] | % Heptane Insolubility |
|---|---|---|---|---|---|
| 12 | 1 | 20:1 | 3.10 | 10,800 | 98.2 |
| 13 | 2 | 10:1 | 3.80 | 11,350 | 97.7 |
| 13 | 3 | 10:1 | 3.24 | 9,800 | 98.3 |
| 15 | 4 | 15:1 | 2.60 | 10,000 | 98.4 |
| 16 | 5 | 5:1 | 3.31 | 10,500 | 94.7 |
| 17 | 6 | 15:1 | 2.26 | 6,655 | 97.8 |
| 18 | 7 | 15:1 | 2.26 | 2,310 | 97.4 |
| CE2 | CE1 | 15:1 | 3.19 | 875 | 96.0 |
| 19 | 8 | 3.3:1 | 4.16 | No. Prod. | No. Prod. |
| 20 | 9 | 7:1 | 2.15 | 5,051 | 95.1 |
| 21 | 10 | 3.3:1 | 3.47 | 550 | 91.9 |
| 22 | 11 | 20:1 | 2.53 | No. Prod. | No. Prod. |

Footnotes:
[1]Moles of 2-methyl-1-pentyloxymagnesium chloride to moles of heterocyclic fused ring compound used in the formation of the catalyst.
[2]Based on the total weight of the catalyst.
[3]Reported as weight of polypropylene product per unit weight of catalyst charged.

The above preferred embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A catalyst component comprising the product formed by the steps of:
   (a) contacting silica with at least one hydrocarbon soluble magnesium-containing compound;
   (b) contacting the product of said step (a) with components (1) and (2) in random order, component (1) being A heterocyclic fused ring compound substituted with at least one oxygen atom and component (2) being a modifying compound selected from the group consisting of silicon halides, boron halides, aluminum halides, alkyl silicon halides and mixtures thereof, with the proviso that the molar ratio of said hydrocarbon soluble magnesium-containing compound to said heterocyclic fused ring compound is at least about 4:1; and
   (c) contacting the product of said step (b) with a first titanium-containing compound having the structural formula $TiX_m(OR)_n$, where X is halogen; R is hydrocarbyl; m is an integer of 1 to 4; and n is 0 or an integer of 1 to 3, with the proviso that the sum of m and n is 4.

2. A catalyst component in accordance with claim 1 comprising contacting said product of step (b), prior to step (c), with a second titanium-containing compound, said second titanium-containing compound having the structural formula $Ti(OR^1)_p X^1_q$, where $R^1$ is hydrocarbyl; $X^1$ is halogen; p is an integer of 1 to 4; and q is 0 or an integer of 1 to 3, with the provisos that the sum of p and q is 4 and that said second titanium-containing compound is not identical to said first titanium-containing compound.

3. A catalyst component in accordance with claim 1 wherein said hydrocarbon soluble magnesium-containing compound and said heterocyclic fused ring compound are present in a concentration such that the molar ratio of said hydrocarbon soluble magnesium-containing compound to said heterocyclic fused ring compound is in the range of between about 5:1 and about 25:1.

4. A catalyst component in accordance with claim 3 wherein said molar ratio is in the range of between about 12:1 and about 21:1.

5. A catalyst component in accordance with claim 4 wherein said molar ratio is in the range of between about 14:1 and about 20:1.

6. A catalyst component in accordance with claim 1 wherein the product of step (a) contacts said component (1) prior to contact of said product with said component (2).

7. A catalyst component in accordance with claim 1 wherein the product of said step (b) is characterized by a flour-like consistency.

8. A catalyst component in accordance with claim 2 wherein the product of said step (b) which contacts said second titanium-containing compound is characterized by a flour-like consistency.

9. A catalyst component in accordance with claim 1 wherein said silica includes a surface characterized by the structural formula

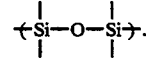

10. A catalyst component in accordance with claim 1 wherein said heterocyclic fused ring compound substituted with at least one carbon atom is selected from the group consisting of 3-benzylidenephthalate, 1,2,4,5-benzenetetracarboxylicdianhydride, dicresol phthalein, diphenic anhydride and benz[CD]indol-2(1H)one.

11. A catalyst component in accordance with claim 10 wherein said heterocyclic fused ring compound substituted with at least one carbon atom is 3-benzylidenephthalide.

12. A catalyst component in accordance with claim 1 wherein said hydrocarbon soluble magnesium-containing compound is 2-methyl-1-pentyloxymagnesium chloride.

13. A catalyst component in accordance with claim 1 wherein said modifying compound is silicon tetrachloride.

14. A catalyst component in accordance with claim 1 wherein said first titanium-containing compound is titanium tetrachloride.

15. A catalyst component in accordance with claim 2 wherein said second titanium-containing compound is titanium tetracresylate.

16. A catalyst component comprising the product formed by the steps of:
   (a) contacting silica, said silica being at least 90% by weight pure silica, with a hydrocarbon soluble magnesium-containing compound selected from the group consisting of dihyhydrocarbyloxymagnesium compounds, hydrocarbyloxymagnesium halides and mixtures thereof;
   (b) contacting the product of said step (a) with
       (1) a heterocyclic fused ring compound substituted with at least one oxygen atom; and (2) a modifying compound selected from the group consisting of silicon halides, boron halides, aluminum halides and mixtures thereof;

said components (1) and (2) contacting the product of said step (a) in random order; and said hydrocarbon soluble magnesium-containing compound and said heterocyclic fused ring compound being present in a concentration such that the molar ratio of said hydrocarbon soluble magnesium-containing compound to said heterocyclic fused ring compound is at least about 5:1; and (c) contacting the product of said step (b) with a first titanium-containing compound having the structural formula $TiX_m(OR)_n$, where X is chlorine or bromine; R is hydrocarbyl; m is an integer of 2 to 4; and n is 0 or an integer of 1 or 2, with the proviso that the sum of m and n is 4.

17. A catalyst component in accordance with claim 16 wherein said soluble magnesium-containing compound is 2-methylpentyloxymagnesium chloride.

18. A catalyst component in accordance with claim 17 wherein the titanium-containing compound of step (c) is titanium tetrachloride.

19. A catalyst component in accordance with claim 18 wherein said component (2) of step (b) is silicon tetrachloride.

20. A catalyst component in accordance with claim 19 wherein said product of step (b) is characterized by a flour-like consistency.

21. A catalyst component in accordance with claim 20 wherein said dried flour-like consistency product is contacted with a second titanium-containing compound having the structural formula $Ti(OR^1)_pX_q$, where $R^1$ is hydrocarbyl; $X^1$ is halogen; pr is an integer of 1 to 4; and q is 0 or an integer of 1 to 3, with the proviso that the sum of p and q are 4, prior to said step (c).

22. A catalyst component in accordance with claim 21 wherein said second titanium compound is titanium tetracresylate.

23. A catalyst component in accordance with claim 22 wherein said component (1) of step (b) is 3benzylidenephthalide.

24. A catalyst component in accordance with claim 23 wherein said silica includes a surface characterized by the structural formula

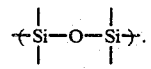

25. A catalyst system comprising the catalyst component of claim 1, an aluminum-containing compound and at least one silane compound.

26. A catalyst system comprising the catalyst component of claim 16, an aluminum-containing compound selected from the group consisting of alkyl aluminums, alkyl aluminum halides and mixtures thereof and a hydrocarbylalkoxysilane.

27. A catalyst system comprising the catalyst component of claim 16, triethylaluminum and isobutyl-isopropyldimethyoxysilane.

* * * * *